US011851345B1

United States Patent
Sen et al.

(10) Patent No.: US 11,851,345 B1
(45) Date of Patent: Dec. 26, 2023

(54) MAGNETIC DATE PALM CHARCOAL NANOCOMPOSITES AND SYNTHESIS THEREOF

(71) Applicant: KING FAISAL UNIVERSITY, Al-Ahsa (SA)

(72) Inventors: Tushar Kanti Sen, Al-Ahsa (SA); Ibrahim Dubdub, Al-Ahsa (SA); Chi Phan, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/226,682

(22) Filed: Jul. 26, 2023

Related U.S. Application Data

(62) Division of application No. 18/130,854, filed on Apr. 4, 2023, now Pat. No. 11,807,548.

(51) Int. Cl.
  *C01G 49/08* (2006.01)
  *B22F 9/18* (2006.01)
  *B82Y 40/00* (2011.01)

(52) U.S. Cl.
  CPC ............. *C01G 49/08* (2013.01); *B22F 9/18* (2013.01); *B22F 2302/25* (2013.01); *B22F 2302/40* (2013.01); *B22F 2999/00* (2013.01); *B82Y 40/00* (2013.01); *C01P 2004/64* (2013.01); *C01P 2006/42* (2013.01)

(58) Field of Classification Search
  None
  See application file for complete search history.

(56) References Cited

U.S. PATENT DOCUMENTS

2018/0016162 A1*  1/2018  Wang ................... C01G 49/08

FOREIGN PATENT DOCUMENTS

| CN | 104388094 A | 3/2015 | |
|---|---|---|---|
| JP | 2015180746 A | 10/2015 | |
| WO | WO-2017133079 A1 * | 8/2017 | ............... B09C 1/08 |

OTHER PUBLICATIONS

Li et al, WO 2017/133079 A1, English Translation From FIT (Year: 2017).*
Ahmad et al., Turning Date Palm Waste into Carbon Nanodots and Nano zerovalent Iron Composites for Excellent Removal of Methylthioninium chloride from Water, Scientific Reports vol. 10, Article No. 16125 (2020).
Rambabu et al., "Nano-activated carbon derived from date palm coir waste for efficient sequestration of noxious 2,4-dichlorophenoxyacetic acid herbicide," Jun. 2021 Chemosphere 282(42):131103. #.
Vinayagam et al., "2,4-Dichlorophenoxyacetic acid (2,4-D) adsorptive removal by algal magnetic activated carbon nanocomposite," Chemosphere vol. 310, Jan. 2023, 136883.

* cited by examiner

*Primary Examiner* — Colin W. Slifka
(74) *Attorney, Agent, or Firm* — Nath, Goldberg & Meyer; Richard C. Litman

(57) ABSTRACT

Novel date palm charcoal iron oxide nanocomposites (DPC-$Fe_3O_4$) are presented, as well as processes for making the same. These synthesized magnetic DPC-$Fe_3O_4$ nanocomposites have wide potential significant applications such as in energy storage devices, electronic devices, sensors, in drug delivery and medicine, catalytic application and also in water purification as an effective strong adsorbent.

5 Claims, No Drawings

MAGNETIC DATE PALM CHARCOAL NANOCOMPOSITES AND SYNTHESIS THEREOF

CROSS-REFERENCE TO RELATED APPLICATION

This application is a divisional of U.S. patent application Ser. No. 18/130,854, filed on Apr. 4, 2023.

BACKGROUND

1. Field

The disclosure of the present patent application relates to novel date palm charcoal iron oxide nanocomposites (DPC-$Fe_3O_4$), as well as processes for making the same.

2. Description of the Related Art

In recent years, the application of biochar material in heavy metal pollution remediation has gotten attention. The biogenic carbon material has a wide range of sources, a large number of microporous structures, a large specific surface area, a strong adsorption capacity, and its adsorption behavior can affect the migration, transformation, and bio-ecological effects of heavy metals in the environment and contaminated environmental media control and repair. The biochar typically contains, on the surface, a large number of functional groups, such as carboxyls, hydroxyls, anhydrides, etc., as well as negative charges, and has a larger surface area. In one instance, after having been applied to the soil, the biochar can adsorb heavy metals and immobilize them on the surface, which can significantly reduce the bioavailability of most heavy metals and improve the physical, chemical and biological properties of the soil, such that soil fertility and crop yield are both improved to some extent.

The biochar material can significantly improve the mobility and availability of arsenic, however. It has been reported that the biochar can reduce the concentration of cadmium and zinc in soil filtrate (by 300 times and 45 times, respectively), but the concentration of arsenic in the filtrate is improved and the biochar improves the mobility of arsenic. Similar results are anticipated with water, rather than soil, decontamination. Therefore, improving the composition and properties of the biochar and the capacity of adsorption and fixation of heavy metals, such as iron, thereof, while reducing the effectiveness of such heavy metals in the soil or water is very challenging and has a great environmental significance.

It has been reported that zero-valent iron can reduce the bioavailability of arsenic in soil or water, and that zero-valent iron has strong electron transfer and adsorption ability. Under aerobic conditions, the biomineralization and iron oxidation are promoted by the electron transfer, thereby promoting the oxidation of trivalent arsenic and the adsorption fixation the pentavalent arsenic. Under anaerobic conditions, the trivalent arsenic may be directly reduced to zero. The bioavailability of arsenic or heavy metals depends on its valence and morphology, and the promotion of the oxidation and adsorption of arsenic can reduce its effectiveness.

Thus, new biochar-iron nanocomposites, as well as methods of making the same, solving the aforementioned problems are desired.

SUMMARY

The present subject matter is directed to novel date palm charcoal iron oxide nanocomposites (DPC-$Fe_3O_4$) as well as a process for making the same.

In one embodiment, the present subject matter relates to a process for preparing a date palm charcoal iron oxide nanocomposite, the process comprising: preparing date palm charcoal by heating raw date palm waste in a slow pyrolysis process; grinding the date palm charcoal to obtain a fine powder of date palm charcoal; adding the fine powder of date palm charcoal and ferric nitrate to one or more solvents to obtain a mixture; drying the mixture to obtain a carbon matrix of iron oxide magnetic nanoparticles; and separating the carbon matrix of iron oxide magnetic nanoparticles from non-magnetic carbon particles to obtain the date palm charcoal iron oxide nanocomposite.

In another embodiment, the present subject matter relates to a date palm charcoal iron oxide nanocomposite made according to the present processes.

In a further embodiment, the present subject matter relates to a process for preparing an iron oxide nanocomposite, the process comprising: adding powder of date palm charcoal and ferric nitrate to ethylene glycol and optionally other solvents to obtain a mixture; drying the mixture to obtain a carbon matrix of iron oxide magnetic nanoparticles; and separating the carbon matrix of iron oxide magnetic nanoparticles from non-magnetic carbon particles to obtain the iron oxide nanocomposite.

These and other features of the present subject matter will become readily apparent upon further review of the following specification.

DETAILED DESCRIPTION OF THE PREFERRED EMBODIMENTS

The following definitions are provided for the purpose of understanding the present subject matter and for construing the appended patent claims.

Definitions

It should be understood that the drawings described above or below are for illustration purposes only. The drawings are not necessarily to scale, with emphasis generally being placed upon illustrating the principles of the present teachings. The drawings are not intended to limit the scope of the present teachings in any way.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a" "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes" "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lowerlimit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

In one embodiment, the present subject matter relates to a process for preparing a date palm charcoal iron oxide nanocomposite, the process comprising: preparing date palm charcoal by heating raw date palm waste in a slow pyrolysis process; grinding the date palm charcoal to obtain a fine powder of date palm charcoal; adding the fine powder of date palm charcoal and ferric nitrate to one or more solvents to obtain a mixture; drying the mixture to obtain a carbon matrix of iron oxide magnetic nanoparticles; and separating the carbon matrix of iron oxide magnetic nanoparticles from non-magnetic carbon particles to obtain the date palm charcoal iron oxide nanocomposite.

In this regard, the synthesis of magnetic date palm charcoal (DPC) iron oxide nanocomposites can comprise two steps. In the first step, raw date palm waste can be placed in an oven at a temperature of about 700°C. to achieve a sloe pyrolysis reaction. For example, pyrolysis of the dried raw date palm wastes can be performed at about 600° C. to about 800° C. in the presence of $N_2$ gas for about 2.5 hours to about 3 hours, for example, in a temperature-controlled muffle furnace, with heating being applied at a rate of about 2.5° C. per min to about 6° C. per min. In an embodiment, pyrolysis of the dried date palm waste can be performed at 680° C. in the presence of $N_2$ gas for 3 hours in a temperature-controlled muffle furnace, with heating being applied at a rate of about 5.5° C. per min. The obtained date palm charcoal can then be ground in a mill to a fine powder and sieved through various mesh screens. The resultant powder can have a particle size of about 150 μm.

In the second step, a carbon matrix of iron oxide magnetic nanoparticles can be prepared by a modified solvothermal process, with ferric nitrate ($Fe(NO_3)_3 \cdot 9H_2O$) serving as the iron precursor and ethylene glycol, as well as any other solvents present, serving as the reducing agents. The prepared date palm charcoal can be added to ethylene glycol with a fixed amount of water, for example, in a 100 ml glass beaker, and the solution can be stirred and then kept in a vacuum degassing system, for example, for 1 hour. In an embodiment, about 2.5 grams of the date palm charcoal powder and ferric nitrate (with various Carbon/Fe molar ratios (0, 20, 35, 40, 80) can he added to 15 mL of ethylene glycol and 10 mL of water in a 50 mL glass beaker and stirred. The mixture can be kept in a vacuum degassing system for about 1 hour. The container, e.g., the glass beaker, containing all the components can be transferred to an autoclave, for example, a sealed Teflon-lined stainless-steel autoclave, and kept at a certain temperature less than 200° C. for a fixed time. For example, synthesis can be carried out for varying reaction times (e.g., 1 hour, 1.5 hour, and 2 hours). The reaction can be carried out at a reaction temperature ranging from about 120° C. to about 180° C., e.g., 120° C., 150° C., and 180° C. In an embodiment, the reaction is carried out for about 2 hours at a temperature of about 180° C. After the reaction time, the whole reaction mixture can be cooled to room temperature, filtered, and washed with methanol and distilled water to remove the remaining ethylene glycol and any soluble-by-products. The product can then be oven dried at 70° C. for a sufficient period of time, for example, for 12 hr.

The final dried magnetic DPC/Fe nanocomposites can then be separated from non-magnetic carbon particles and weighed and analyzed. An optimum DPC/Fe molar ratio can be about 35.

Accordingly, in certain embodiments, the raw date palm waste used in the present processes can be heated at a temperature of less than 700°C. In certain embodiments in this regard, the temperature at which the raw date palm waste is heated can be increased at a rate of about 2.5° C. min. In other embodiments, the raw date palm waste can be heated in the presence of $N_2$ for less than three hours.

In this regard, the date palm solid wastes used as a starting material herein can be the by-product of using raw date palm biomass for other purposes. The date palm solid waste represents an attractive precursor for cost-effective production of the date palm charcoal/activated carbon because of its high cellulose, hemicellulose, and lignin content and low ash load.

In further embodiments, the one or more solvents can be selected from the group consisting of ethylene glycol, water, and combinations thereof.

Similarly, the mixture can be obtained via a modified solvothermal process. In this regard, the mixture can be maintained at a specific temperature of less than 200° C.

In further embodiments, once obtained, the mixture can be cooled to room temperature, filtered, and washed with methanol and/or distilled water prior to drying to remove any remaining solvent and/or soluble by-products. Once this step is completed, the drying can occur, for example, at about 70° C. for about 12 hours.

In another embodiment, the present subject matter relates to a date palm charcoal iron oxide nanocomposite prepared according to the processes and methods presented herein. In one embodiment, the date palm charcoal iron oxide nanocomposite produced herein can have an average crystal size of less than 20 nm. In another embodiment, by virtue of the specific synthetic process used, the carbon matrix of iron oxide magnetic nanoparticles can be distributed on a surface of the date palm charcoal.

In a further embodiment, the produced date palm charcoal/activated carbon can possess a large surface area, highly developed porosity, highly variable surface chemistry, and reactivity. For example, the surface of the date palm charcoal can be porous in nature. The Brunaer-Emmett-Teller (BET) surface area of the date palm charcoal can be about 150 m$^2$/g.

In an alternative embodiment, the present subject matter relates to a process for preparing an iron oxide nanocomposite, the process comprising: adding ferric nitrate to ethylene glycol and optionally other solvents to obtain a mixture; drying the mixture to obtain a carbon matrix of iron oxide magnetic nanoparticles; and separating the carbon matrix of iron oxide magnetic nanoparticles from non-magnetic carbon particles to obtain the iron oxide nanocomposite.

In certain embodiments in this regard, the mixture can be obtained via a modified solvothermal process with the ferric nitrate serving as an iron precursor and the ethylene glycol serving as a reducing agent. In further embodiments, the mixture can be maintained at a temperature of less than 200° C. In additional embodiments, the mixture can be cooled to room temperature, filtered, and washed with methanol and/or distilled water prior to drying to remove any remaining solvent and/or soluble by-products. Once this step is completed, the drying can occur, for example, at about 70° C. for about 12 hours.

Magnetic nano-iron oxides made according to the present methods can potentially be used as catalytic materials, effective adsorbents, pigments, flocculants, for magnetic data storage, in bio separation, and in the medicine field. However, there are three major challenges when using these nanomaterials. Firstly, strong magnetic dipole-dipole attractions between particles in pure $Fe_3O_4$ cause agglomeration. Secondly, pure iron-oxides nanoparticles are easily oxidized/dissolved in acidic mediums. Thirdly, it is difficult to recycle/separate these nanoparticles with such a small size, especially in a continuous system.

To overcome all these difficulties and to improve the potential properties of both iron-oxide nanoparticles and activated charcoal, magnetic modification of carbon particles can be due to presence of magnetic iron oxide or magnetite or different types of ferrites on the surface and in the pores of the host matrix carbon/charcoal. By way of non-limiting example, the present Magnetic Date Palm Charcoal (DPC) Nano Composites can be made with 100% magnetite particles of average less than 20 nm crystal sizes and having the maximum amounts of magnetic particles uniformly distributed on the surface of the DPC.

In experiment, it was found that magnetite crystal size increases with DPC/Fe molar ratio. At an optimum DPC/Fe molar ratio of 35, for example, the crystal size of magnetic iron-oxide was about 16.2 nm. According to energy-dispersive X-ray (EDX) spectroscopy of the sample, the synthesized nanomaterials contained only Fe and O and C elements, which indicate the high purity of DPC-Fe nanocomposites. The amount of iron compounds varied from about 0.42 g to about 0.78 g, with the decrease of DPC/Fe molar ratio being from about 80 to about 20 and an optimum molar ratio being 35. A maximum iron compound of 0.78 g was obtained. A minimum amount of iron compounds of 0.20 g was obtained in the absence of DPC charcoal.

Similarly for an optimum reaction temperature of 180° C. and an optimum DPC/Fe molar ratio of 35, the obtained percentage of magnetic compounds was maximum 100% at an optimum 2 hrs reaction time. Only 40.2% magnetic compounds was obtained at a reaction time of 1 hour. From the XRD magnetite peak, the various magnetite crystal sizes of 17.2 nm, 13.8 nm and 13.1 nm were formed for a reaction time of 2 hr, 1.5 hr and 1 hr respectively.

The average size of the magnetite $Fe_3O_4$ was 15.1 nm and 16.2 nm at 150° C. and 180° C., respectively. There was no XRD peak for 120 reaction time. Further, 100% magnetic compound was produced at a reaction temperature of 180° C. reaction. The percentage of magnetic compounds varied from 2.5% to 100% with reaction temperatures of 120° C., 150° C., and 180° C.

The effect of various solvents like ethylene glycol (EG), propylene glycol (PG), polyethylene glycol (PEG), and methanol (MeOH) on DPC-iron-oxide nano composites were studied. It was found that 100% magnetic compounds were obtained using ethylene glycol as reducing agent compared to 98.9% for propylene glycol (PG). But only 4.1% and 4.6% of magnetic compounds were produced for PEG and MeOH, respectively. The average crystal sizes were 17.5 nm and 14.7 nm with EG and PG, respectively.

In certain embodiments, the date palm charcoal iron oxide nanocomposites presented herein can be used in a wide variety of applications, such as by way of non-limiting example in energy storage devices, electronic devices, sensors, in drug delivery and medicine, catalytic application, bio separation, and also in water purification as an effective strong adsorbent. In water purification technology, application of the present nanocomposites will give a much more cost-effective and sustainable solution towards water decontamination.

It is to be understood that the date palm charcoal iron oxide nanocomposites are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A process for preparing an iron oxide nanocomposite, the process comprising:
   preparing a date palm charcoal powder;
   adding the date palm charcoal powder and ferric nitrate to ethylene glycol and optionally other solvents to obtain a mixture;

drying the mixture to obtain a carbon matrix of iron oxide magnetic nanoparticles; and separating the carbon matrix of iron oxide magnetic nanoparticles from non-magnetic carbon particles to obtain the iron oxide nanocomposite.

2. The process of claim 1, wherein the mixture is obtained via a modified solvothermal process with the ferric nitrate serving as an iron precursor and the ethylene glycol serving as a reducing agent.

3. The process of claim 1, wherein the mixture is maintained at a temperature of less than 200° C.

4. The process of claim 3, wherein the mixture is cooled to room temperature, filtered, and washed with methanol and/or distilled water prior to drying to remove any remaining solvent and/or soluble by-products.

5. The process of claim 4, wherein the drying occurs at about 70° C. for about 12 hours.

\* \* \* \* \*